(12) United States Patent
Wagner

(10) Patent No.: US 10,113,339 B2
(45) Date of Patent: Oct. 30, 2018

(54) FUEL DOOR ACTUATOR

(71) Applicant: Kiekert AG, Heiligenhaus (DE)

(72) Inventor: Adrin Wagner, Saline, MI (US)

(73) Assignee: Kiekert AG, Heiligenhaus (DE)

( * ) Notice: Subject to any disclaimer, the term of this patent is extended or adjusted under 35 U.S.C. 154(b) by 847 days.

(21) Appl. No.: 14/705,330

(22) Filed: May 6, 2015

(65) Prior Publication Data

US 2016/0326777 A1 Nov. 10, 2016

(51) Int. Cl.
*E05B 81/24* (2014.01)
*B60K 15/05* (2006.01)
*F16H 25/12* (2006.01)

(52) U.S. Cl.
CPC .............. *E05B 81/25* (2013.01); *B60K 15/05* (2013.01); *F16H 25/125* (2013.01);
(Continued)

(58) Field of Classification Search
CPC .. B60K 15/05; B60K 15/0515; B60K 15/053; B60K 2015/053; B60K 2015/0515;
(Continued)

(56) References Cited

U.S. PATENT DOCUMENTS 5,066,062 A * 11/1991 Sekulovski ............ B60K 15/05
292/144
5,533,766 A * 7/1996 Farber ..................... B60K 15/05
292/144

(Continued)

FOREIGN PATENT DOCUMENTS

DE         10050558        4/2002
DE       102004056152   *   6/2006
GB          871138      *   6/1961

OTHER PUBLICATIONS

International Search Report and Written Opinion for corresponding Patent Application No. PCT/IB2016/000585 dated Aug. 19, 2016.

*Primary Examiner* — Dennis H Pedder
(74) *Attorney, Agent, or Firm* — Renner, Otto, Boisselle & Sklar, LLP

(57) ABSTRACT

The invention concerns an Actuator for a fuel tank cap (1) or tailboard in a vehicle comprising a latch (2) for locking the fuel tank cap (1) or tailboard as well as an electric drive (3) to enable an automatic opening and closing cycle of the fuel tank cap or tailboard, wherein a rotatable control plate (4) with a control contour for transmitting a force and/or motion by means of a preferably direct contact to at least one adjacent member is designed such that the transmission of force and/or motion depends on the rotation position of the control plate (4). A compact actuator can be obtained. The invention further concerns a method for actuation the fuel tank cap (1) or tailboard, wherein firstly, a latch release cable (10) is pulled in order to unlock the latch (2), secondly, a rotation motion is transmitted in order to open the fuel tank cap (1) or tailboard, thirdly, the latch release cable (10) is released until the closing step is initiated, and/or fourthly, the cycle comprising the first, second, third, and/or forth sequence runs in reverse order and direction for automatically closing the fuel tank cap (1) or tailboard. A very easy automatic opening and closing cycle can be obtained.

18 Claims, 3 Drawing Sheets

Figure 1:
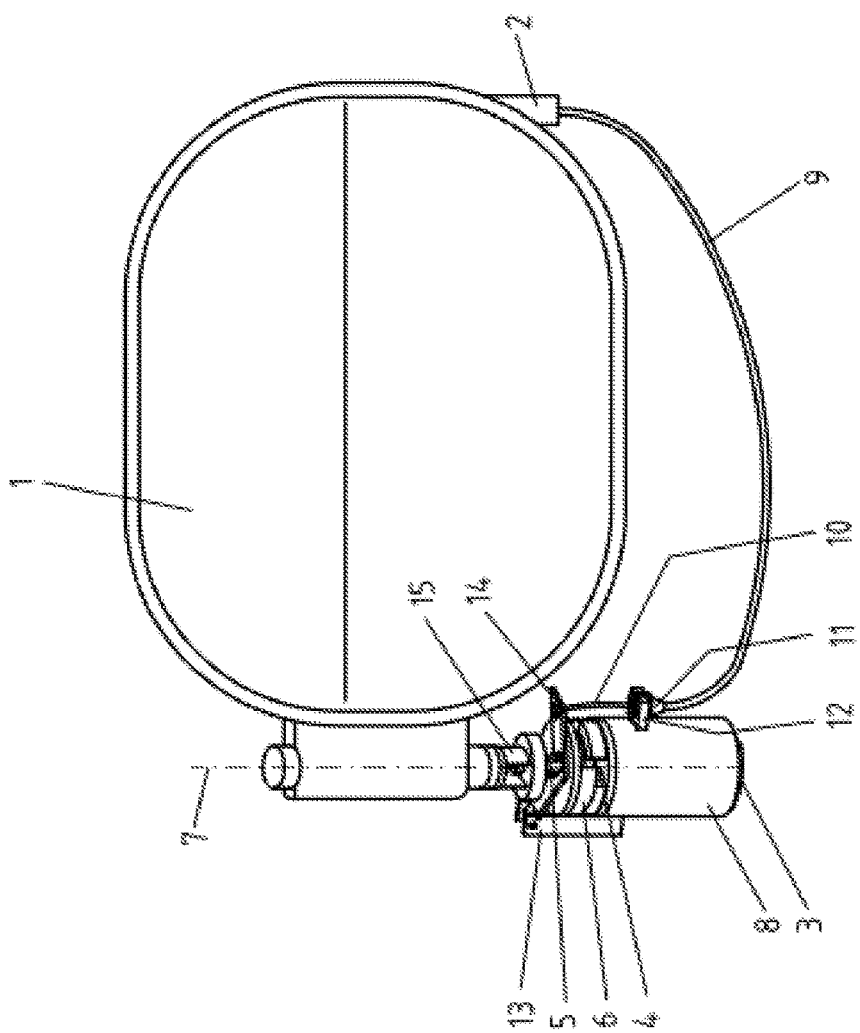

(52) U.S. Cl.
CPC .............................. *B60K 2015/053* (2013.01);
*B60K 2015/0538* (2013.01); *B60K 2015/0576*
(2013.01)

(58) Field of Classification Search
CPC .... B60K 2105/0538; B60K 2105/2015; B60K
2105/0561; B60K 2015/0569; B60K
2015/0576; B60K 2015/0584; E05B
81/25; E05B 81/28
USPC ..................................................... 296/97.22
See application file for complete search history.

(56) References Cited

U.S. PATENT DOCUMENTS

| 2008/0197660 | A1 | 8/2008 | Busch |
| 2009/0242557 | A1 | 10/2009 | Journee |
| 2013/0154402 | A1 | 6/2013 | Basavarajappa et al. |
| 2014/0291996 | A1 | 10/2014 | Basavarajappa et al. |

\* cited by examiner

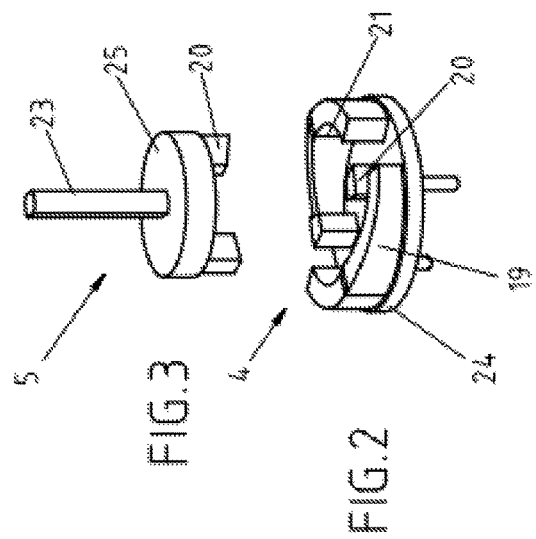
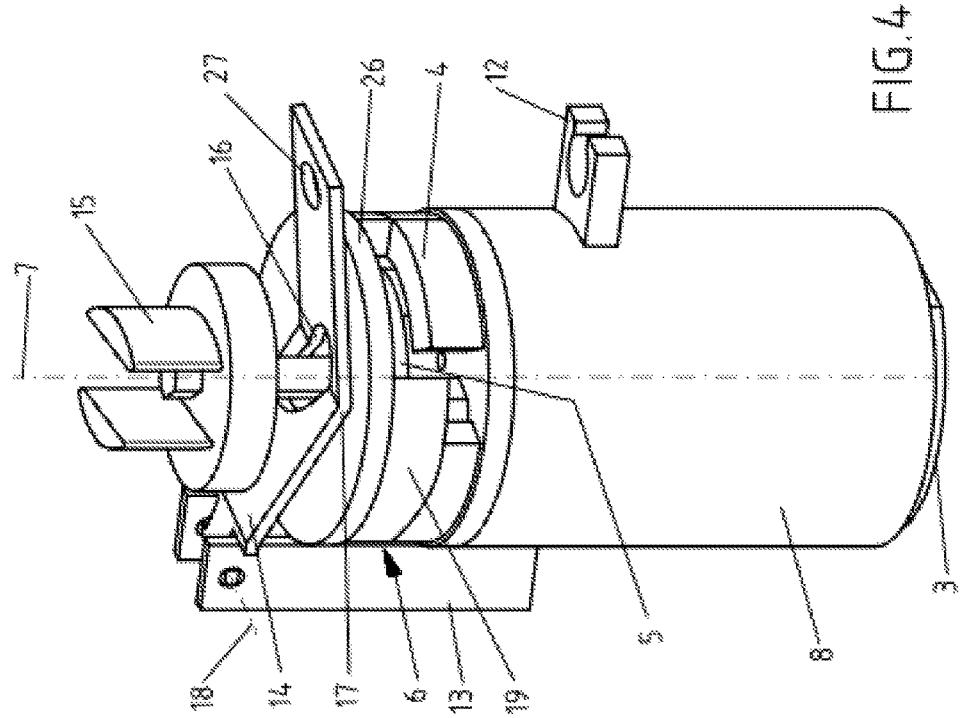

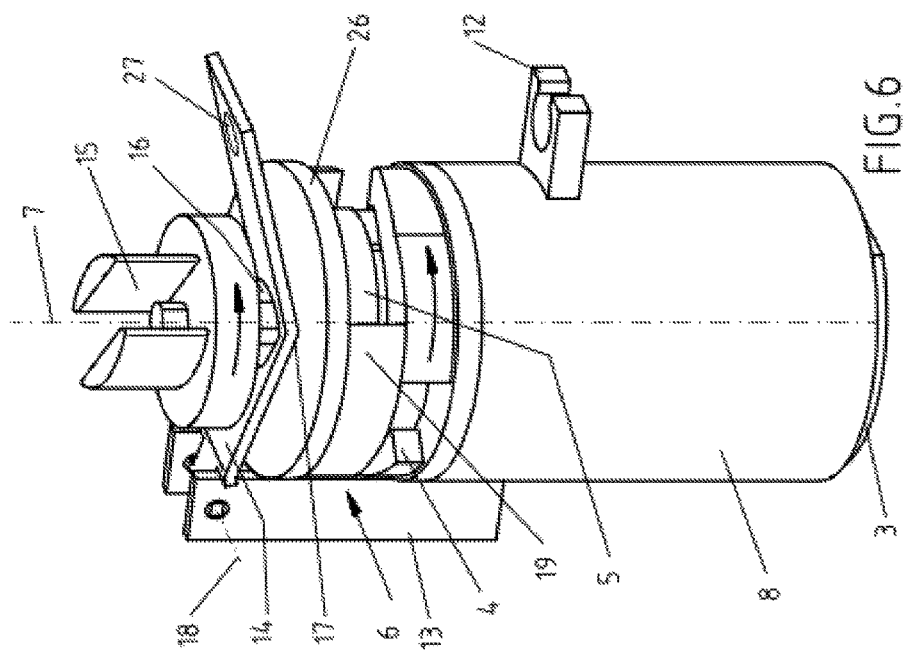
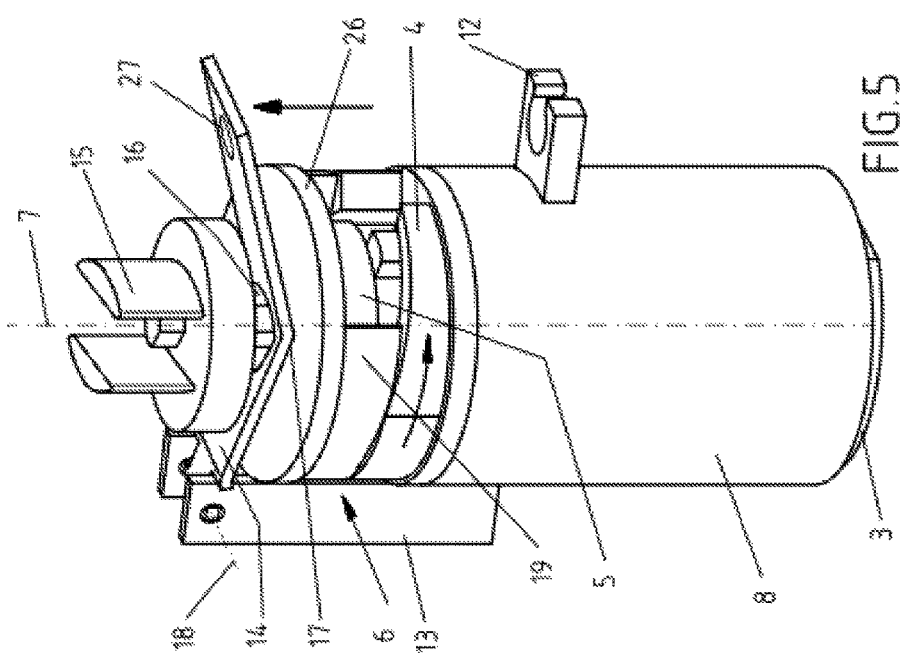

FUEL DOOR ACTUATOR

The invention concerns an actuator for a fuel tank cap or tailboard in a vehicle as well as a method for actuation of the fuel tank cap or tailboard.

Document US20140291996A1 discloses a lock for a fuel tank cap or tailboard in a vehicle, comprising a locking bolt which can be adjusted between an open and a closed position by opening and closing the cap or tailboard. A simple manual opening and closing of the fuel tank cap can achieved.

In order to provide a vehicles with higher comfort, an automatic opening and closing of a fuel tank cap or tailboard is desired. At the same time, a compact construction with a little number of parts but reliable function is required for implementation in a vehicle.

The purpose of the invention is to provide a further developed actuator and method for opening and closing a fuel tank cap or tailboard in a vehicle.

For the solution of the problem serves an actuator according to the main claim as well as a method according to the independent claim. Preferred embodiments are described in the dependent claims.

The problem is solved by means of an actuator for a fuel tank cap or tailboard in a vehicle comprising a latch for locking the fuel tank cap or tailboard as well as an electric drive to enable an automatic opening and closing cycle of the fuel tank cap or tailboard, wherein a rotatable control plate with a control contour for transmitting a force and/or motion by means of a preferably direct contact to at least one adjacent member is designed such that the transmission of force and/or motion depends on a rotation position of the control plate.

An electric drive is typically an electric engine with a gear to provide the energy to rotate an output shaft.

Automatic means driven by a non-manual and energy consuming power such as an engine. A spring cannot drive an automatic motion.

An opening and closing cycle refers to one or more subsequent sequences of actions that enable a fuel tank cap or tailboard to reach an opening or closing position.

A control contour is a contour of a part which is formed in a way that controlled transmission of forces and/or motion can be enabled through an interaction with adjacent members.

Transmitting a force and/or motion of one member to another member means that the one member for example pushes against another member. A transmission of force typically occurs when the other member does not move during pushing. A transmission of motion usually occurs when the other member is moved by the one pushing member.

Direct contact between two members means that the surfaces of both members touch each other, particularly without any third member in between.

Rotation position refers to an angle of rotation around an axis.

By means of an actuator for a fuel tank cap or tailboard in a vehicle according to the main claim, only one single electric drive can enable a linear force and/or motion to unlock or lock the latch as well as to open and close the fuel tank cap or tailboard fully automatically. Furthermore, an implementation can be achieved in a very compact manner, very few parts and very reliable function. Additional advantages include high energy efficiency and little wearing due to solid dimensioning of the components.

Another aspect of the invention concerns a fuel tank cap actuator system comprising a fuel tank cap 1 and an actuator according to claim 1.

Details and further advantages are provided in the following description of the figures which depicts a preferred execution example with the necessary details and individual components.

FIG. 1: Actuator for a fuel tank cap in a vehicle

FIG. 2: Control plate with a control contour

FIG. 3: Torque plate with cams and a torque shaft

FIG. 4: Part of the actuator (fuel tank cap is closed and locked)

FIG. 5: Part of the actuator (fuel tank cap is closed and unlocked)

FIG. 6: Part of the actuator (fuel tank cap is open and unlocked)

FIG. 1 shows an actuator implemented in a vehicle to automatically open and close a fuel tank cap 1 comprising a latch 2 and an electric drive 3 that can rotate a control plate 4 with a control contour around an axis 7.

To open the fuel tank cap 1, an electric engine of the electric drive 3 can be activated to rotate the control plate 4 (FIG. 2) which pushes against a mating plate 6 to provide linear motion capable of pulling a latch release cable 10 of a Bowden cable 9 to unlock the latch 2. Then, in course of rotation, the control plate 4 catches a torque plate 5 (FIG. 3) which turns a torque shaft 23 capable of turning respectively opening the fuel tank cap 1. Reversing the above sequences, electric drive 3 causes the mechanism to turn respectively close the fuel tank cap 1 and then to relieve tension on the latch release cable 10 to lock the fuel tank cap 1. The actuator is preferably designed in a way that the latch release cable 10 is released and kept released as long as the fuel tank cap is open in order to increase life time of the actuator.

The transmission of force and/or motion from the control plate 4 to the mating plate 6 and torque plate 5 is realized through ramps 19, cams 20 and a web 21, which are arranged such that the targeted time sequence of force and/or motion transmission to the mating plate 6 and torque plate 5 is enabled to allow the above described automatic opening and closing cycle of the fuel tank cap 1 including timed locking and unlocking of the latch 2 and turning of the fuel tank cap 1.

The Bowden cable 9 comprises an inner latch release cable 10 and an outer Bowden cable housing 11.

Preferably, the mating plate 6 comprises a mating base plate 26 with a different, preferably bigger, diameter than a torque base plate 25 of a torque plate 5. This allows compact arrangement of both members, particularly in an interleaved manner.

Preferably, the control base plate 24 of the control plate 4 has an equal, roughly equal, or bigger diameter compared to a mating base plate 26 of a mating plate 6, a torque base plate 25 of a torque plate 5 and/or a housing 8 of the electric drive 3, preferably the diameter of the control base plate 24 equals or roughly equals the diameter of the mating base plate 26 and/or the housing 8. This allows compact arrangement of both members, particularly also in an interleaved manner.

Preferably the mating contour of the mating plate 6 comprises a ramp 19, which is arranged on the side of a mating base plate 26 that is facing the control plate 4 and/or a torque plate 5.

Preferably, there is an interconnecting member 15 for coupling the torque plate 5 with the fuel tank cap 1 or tailboard, preferably by means of a rotational form fit connection to a torque shaft 23 of the torque plate 5. This enables a very simple realization with few parts.

Preferably the cam 20 of a torque plate 5 is supported by the control plate 4, preferably with direct contract between a torque contour, particularly a cam 20 of the torque plate 4, and a control base plate 24 of the control plate 4, particularly in a sliding manner. This allows a very compact design.

There is a cable lever 14 to lock and unlock the latch 2, particularly with a stripe-shaped cable lever 14.

Preferably, the cable lever 14 can rotate around a cable lever axis 18, which is crosswise oriented towards an axis 7 of rotation of the control plate 4 and/or arranged at an end of the cable lever 14.

Preferably, the cable lever 14 comprises a cable lever shaft aligned with an cable lever axis 18, which is mounted on a particularly Y-shaped housing arm 13 of the housing 8 of the electric drive 3, and/or a latch release cable interface 27 for mounting a latch release cable 10 of a Bowden cable 9, particularly at another end of the cable lever 14, preferably opposed to the end with a cable lever axis 18.

Preferably, the Bowden cable housing 11 is mounted on a housing holder 12 of a housing 8 of the electric drive 3, particularly at a lateral area of the housing 8, preferably at the opposite side of a housing arm 13 for mounting a cable lever 14.

Preferably, a housing holder 12 for a Bowden cable housing 11 is placed below a latch release cable interface 27 for a latch release cable 10.

Preferably, the electric drive 3 comprise an epicyclic gear, particularly with three gear rolls. This enables a very compact design.

In one embodiment, there is a torque plate 5 for opening and/or closing the fuel tank cap 1 or tailboard comprising a torque contour for interacting with the control contour of the control plate 4 preferably through direct contact in order to transmit a force and/or motion from the control plate 4 to the torque plate 5, a mating plate 6 for lock and/or unlock the latch 2 comprising a mating contour for interacting with the control contour of the control plate 4 preferably through direct contact in order to transmit a force and/or motion from the control plate 4 to the mating plate 6, and/or a control plate 4, a torque plate 5 and/or a mating plate 6 are arranged centered on a same axis 7, preferably the same axis 7 like the longitudinal axis 7 of rotation of the electric drive 3 and/or the fuel door cap 1 or tailboard.

A very simple realization of the actuator can by thereby achieved with very few but strong dimensioned parts in a very compact manner.

In one embodiment, the control plate 4, a torque plate 5 and/or a mating plate 6 have a disk shape. This helps to save installation space.

In one embodiment, a torque plate 5 is arranged in between the control plate 4 and a mating plate 6 along an axis 7 of rotation of the control plate 4. This allows very compact and interleaved construction.

In one embodiment, the control contour comprises a ramp 19, a cam 20 and/or a web 21, preferably curved along or in parallel to a part of the circumference, a mating contour of a mating plate 6 comprises a ramp 19, preferably curved along or in parallel to a part of the circumference, and/or a torque contour of a torque plate 5 comprises at least one cam 20 or exactly two cams 20. A transmission of force and/or motion on very little space in a very reliable and energy efficient manner can thereby be achieved.

In one embodiment, the control contour comprises a ramp 19 of at least a radian measure of 15°, preferably 30°, very preferred 45, and/or at most a radian measure of 360°, preferably 270°, very preferred 210°, and/or a mating contour of the mating plate 6 comprises a ramp 19 with at least a radian measure of 30°, preferably 45°, very preferred 85°, and/or at most a radian measure of 360°, preferably 330°, very preferred 300°. A timely sequenced opening and closing cycle can thereby be achieved very easily and with very few parts.

In one embodiment, the control contour comprises at least one gap between two ramps 19 or a ramp 19 and a web 21 and/or a ramp 19 has a slope that allows sliding up or down in direction of an axis 7 of rotation of the control plate 4. A timely sequenced opening and closing cycle with locking and unlocking, which requires not only rotation but also linear actuation motion, can thereby be achieved very easily and with very few parts, particularly with only one engine.

In one embodiment, the control contour comprises a cam 20, which is arranged closer to an axis 7 or rotation of the control plate 4 than a ramp 19 and/or web 21. An interleaved, compact design can thereby be achieved.

In one embodiment, the control contour is arranged on the side of a control base plate 24 that is facing the mating plate 6 and/or opposing a housing 8 of the electric drive 3, and/or a torque contour of a torque plate 5 is arranged on a side of a torque base plate 25 that is facing the control plate 4 and/or oppose the mating plate 6. This allows an interleaved, compact design.

In one embodiment, the torque plate 5 comprises a centered torque shaft 23, which is particularly in parallel to or aligned with an axis 7 or rotation of the control plate 4. This allows an interleaved, compact design.

In one embodiment, the torque plate 5 comprises a centered torque shaft 23 with a not rotation-symmetric cross sectional contour, preferably round shaped with a two edges coupling for enabling a rotational form fit connection to the fuel tank cap 1 or tailboard. A simple realization can thereby be achieved.

In one embodiment, the torque shaft 23 of a torque plate 5 extents through hole of a mating plate 6. This enables a very compact design.

In one embodiment, during a closing and/or opening cycle of the fuel tank cap 1 or tailboard, the control plate 4 and/or a torque plate 5 can rotate, particularly around an axis 7, a mating plate 6 is not designed to rotate during a closing and/or opening cycle of the fuel tank cap 1 or tailboard, a ramp 19 of a mating plate 6 can slide up, down or along a ramp 19 and/or a web 21 of the control plate 4, and/or at least one cam 20 of the control plate 4 can push a cam 20 of a torque plate 5. These features enable the conversion of rotation of the output shaft into rotation on the one side and linear motion on the other side. A highly demanding problem can thereby be solved very easily within very little construction space and very reliably.

In one embodiment, the cable lever 14 is v-shaped, and/or is on one side rotatable mounted at a housing 8 of the electric drive 3 and/or at another side comprises a latch release cable interface 27 for mounting a latch release cable 10 of a Bowden cable 9 for locking and/or unlocking the latch 2. A v-shaped cable lever 14 enables a levered motion path and thus can save construction space while being very energy efficient. This particularly applies when the cable lever 14 is on the one side mounted and on the other side connected to the latch release cable 10.

In one embodiment, the housing arm 13 of the housing 8 for mounting a cable lever 14 extends in parallel to an axis 7 of rotation of the control plate 4 and/or arranged at a lateral area of the housing 8. A compact design can thereby be obtained and further parts avoided.

In one embodiment, the cable lever 14 comprise a v-edge 17, which is arranged roughly in a center area of the cable lever 14 and/or rather closer to a latch release cable interface 27 than a cable lever axis 18. This enables a levered motion path and thus can save construction space while being very energy efficient.

In one embodiment, the cable lever 14 comprises an oblong hole 16, particularly nearby a centered area and/or a v-edge 17 of the cable lever 14. A very compact design can thereby be achieved.

In one embodiment, the cable lever 14 is supported on a mating plate 6, preferably with direct contact between a v-edge 17 and a mating plate 6, particularly a mating base plate 26, preferably on the opposed side to the control plate 4. A very simple, linear force and/or motion transmission can be thereby achieved in a very space efficient manner.

In one embodiment, the cable lever 14 can be preloaded through an attached latch release cable 10 such that the cable lever 14 presses on an adjacent mating plate 6 that again pressed on the control plate 4 for facilitating transmission of force and/or motion. As a result, no extra parts are needed to hold or hold together the control plate 4 and the mating plate 6 and the torque plate 5 for allowing interactions and facilitating force and/or motion transmission among them. At the same time, the torque contour becomes without extra parts or effort encased between the mating plate and the control plate.

In one embodiment, the ramp 19, the web 20 and/or the cam 21 of the control plate 4, mating plate 6 and/or torque plate 5 are arranged eccentrically to an axis 7 of rotation of the control plate 4. This enables very efficient force and/or motion transmission by means of a very compact design.

In one embodiment, the actuator is designed such way that rotational motion of the electric drive 3 is converted into a linear motion for unlock the latch 2 of the fuel tank cap 1 or tailboard and a rotational motion for the automatic opening and closing cycle, wherein the linear motion and the rotational motion can follow a predefined time sequence, particularly depending on the rotation position of the control plate 4. Thereby, only one single electric drive can enable a linear force and/or motion to unlock or lock the latch as well as to open and close the fuel tank cap or tailboard fully automatically.

The method according to another aspect of the invention—as illustrated by the FIGS. 4 to 6—for actuation of the fuel tank cap 1 or tailboard in a vehicle comprising a latch 2 for locking the fuel tank cap 1 or tailboard as well as an electric drive 3 to enable an automatic opening and closing cycle of the fuel tank cap or tailboard can comprise one or more of the following sequences.

In a first sequence (FIGS. 4 to 5), the control plate 4 rotates in counterclockwise (present embodiment) or clockwise (if the fuel tank cap would be placed on the opposite vehicle side) direction to unlock the latch 2, particularly with a rotation of more than 45°, preferably more than 60°, especially preferably more than 85°, and/or less than 360°, preferably less than 270°, especially preferably less than 180°.

In a second sequence (FIGS. 5 to 6), the control plate 4 can rotate in counterclockwise (present embodiment) or clockwise direction to open the fuel tank cap 1 or tailboard, particularly with a rotation of more than 45°, preferably more than 60°, especially preferably more than 85°, and/or less than 360°, preferably less than 270°, especially preferably less than 180°.

In a third sequence, the control plate 4 can rotate in counterclockwise or clockwise direction, preferably for less than a half rotation, to releasing a latch release cable 10 and then stops rotation.

In a fourth sequence, the control plate 4 can rotate in clockwise or counterclockwise direction, preferably for less than half rotation, for pulling a latch release cable 10 to unlock the latch 2, particularly upon initiating a closing cycle of the fuel tank cap 1 or tailboard.

In a fifth sequence, the control plate 4 can rotate in clockwise or counterclockwise direction to close the fuel tank cap 1 or tailboard, particularly with a rotation of more than 45°, preferably more than 60°, especially preferably more than 85°, and/or less than 360°, preferably less than 270°, especially preferably less than 180°.

In a sixth sequence, the control plate 4 can rotate in clockwise or counterclockwise direction to lock the latch 2, particularly with a rotation of more than 45°, preferably more than 60°, especially preferably more than 85°, and/or less than 360°, preferably less than 270°, especially preferably less than 180°.

In counterclockwise or clockwise direction is not a contradiction but refers to the usage of the method on actuators either on the left or right side of a vehicle. Depending on the position at the vehicle and the opening direction of the fuel tank cap 1 or tailboard, either the first or the second direction term i.e. counterclockwise or clockwise is applicable.

A very simple and reliable method of automatic opening and closing can be obtained.

The invention claimed is:

1. An actuator for a fuel tank cap in a vehicle comprising:
   a latch for locking the fuel tank cap;
   an electric drive to enable an automatic opening and closing cycle of the fuel tank cap;
   a control plate rotatable by the electric drive and having a control contour;
   a torque plate having a torque contour that interacts with the control contour by direct contact for transmitting a force and motion to the torque plate, wherein the transmission of force and motion depends on a rotation position of the control plate; and
   a mating plate having a mating contour that interacts with the control contour by direct contact, whereby the torque plate transmits the force and motion from the control plate to the mating plate,
   wherein the control plate, the torque plate and the mating plate are arranged along a longitudinal axis of rotation of the electric drive or the fuel tank cap.

2. The actuator of claim 1, wherein at least one of the control plate, the torque plate and the mating plate have a disk shape.

3. The actuator of claim 1, wherein the torque plate is arranged in between the control plate and the mating plate along an axis of rotation of the control plate.

4. The actuator of claim 1, wherein
   the control contour comprises two ramps two cams and a web that are curved along or in parallel to a part of a circumference of the control contour,
   the mating contour of the mating plate comprises a ramp that is curved along or in parallel to a part of the circumference, and
   the torque contour of the torque plate comprises two cams.

5. The actuator of claim 1, wherein
   the control contour comprises a ramp having a radian measure between 15° and 360°, and
   the mating contour of the mating plate comprises a ramp having a radian measure between 30° and 360°.

6. Actuator of claim 1, wherein the control contour comprises two cams which are arranged closer to an axis or rotation of the control plate than at least one of a ramp and a web.

7. The actuator of claim 1, wherein
the control contour is arranged on a side of a control base plate that is facing the mating plate and opposing a side of the control base plate that faces a housing of the electric drive, and
the torque contour of the torque plate is arranged on a side of a torque base plate that is facing the control plate and opposes the mating plate.

8. The actuator of claim 1, wherein the torque plate comprises a centered torque shaft which is aligned with an axis of rotation of the control plate.

9. The actuator of claim 1, wherein the torque plate comprises a centered torque shaft having a not rotation-symmetric cross sectional contour that is round shaped with a two edges coupling for enabling a rotational form fit connection to the fuel tank cap.

10. The actuator of claim 1, wherein a torque shaft of a torque plate extents through a hole of the mating plate.

11. The actuator of claim 1, wherein during at least one of a closing or a opening cycle of the fuel tank cap,
at least one of the control plate and the torque plate can rotate around an axis,
the mating plate is non-rotatable during the closing or the opening cycle of the fuel tank cap,
a ramp of the mating plate is slideable up, down or along a ramp of the control plate, and
at least one cam of the control plate can push a cam of the torque plate.

12. The actuator of claim 1, further comprising a cable lever which is v-shaped, and which is on one side rotatably mounted at a housing of the electric drive and at another side comprises a latch release cable interface for mounting a latch release cable of a Bowden cable for locking and unlocking the latch.

13. The actuator of claim 12, further comprising a housing arm of the housing for mounting the cable lever, wherein the housing arm extends in parallel to an axis of rotation of the control plate and is arranged at a lateral area of the housing.

14. The actuator of claim 12, wherein the cable lever comprises a v-edge which is arranged in a center area of the cable lever and is closer to the latch release cable interface than an axis of the cable lever.

15. The actuator of claim 12, wherein the cable lever comprises an oblong hole that is near a centered area of the cable lever.

16. The actuator of claim 12, wherein the cable lever is supported on the mating plate by direct contact between a v-edge of the cable lever and the mating plate on an opposed side to the control plate.

17. The actuator of claim 12, wherein the cable lever preloaded through the attached latch release cable such that the cable lever presses on the mating plate pressed on the control plate for facilitating transmission of force and motion.

18. The actuator of claim 1, wherein rotational motion of the electric drive is converted into a linear motion for unlocking the latch of the fuel tank cap or and a rotational motion for the automatic opening and closing cycle, wherein the linear motion and the rotational motion follow a pre-defined time sequence depending on the rotation position of the control plate.

* * * * *